(No Model.)
W. H. GRANT.
WAGON BRAKE.
No. 434,776. Patented Aug. 19, 1890.
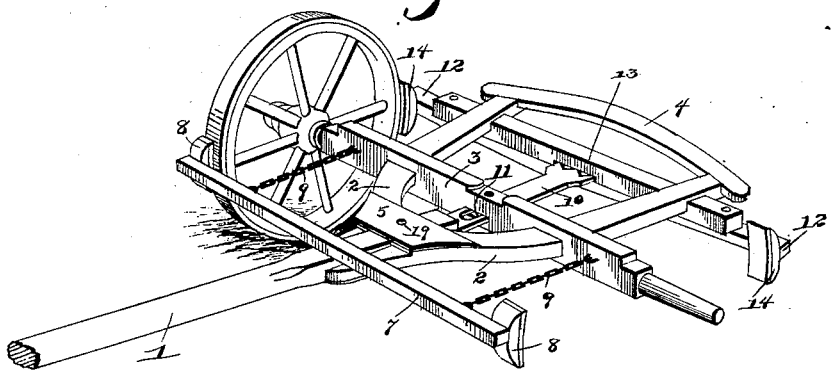
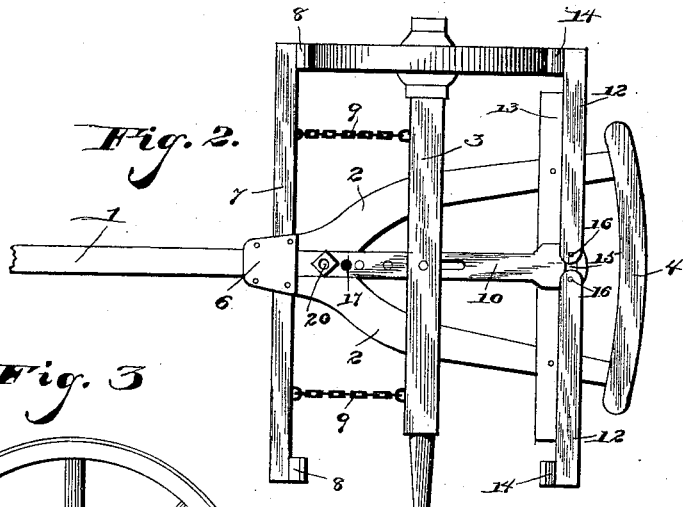
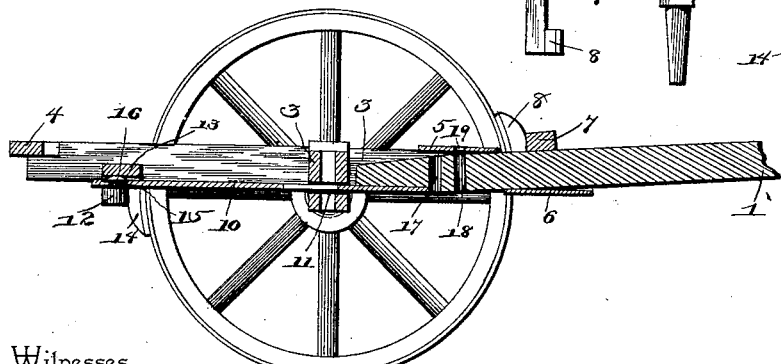
Witnesses
Samuel Ker
H. F. Riley
Inventor
William H. Grant
By his Attorneys.
C. A. Snow & Co.

UNITED STATES PATENT OFFICE.

WILLIAM H. GRANT, OF WALTHAM, MAINE.

WAGON-BRAKE.

SPECIFICATION forming part of Letters Patent No. 434,776, dated August 19, 1890.

Application filed June 6, 1890. Serial No. 354,446. (No model.)

*To all whom it may concern:*

Be it known that I, WILLIAM H. GRANT, a citizen of the United States, residing at Waltham, in the county of Hancock and State of Maine, have invented a new and useful Wagon-Brake, of which the following is a specification.

The invention relates to improvements in automatic brakes for vehicles.

The object of the present invention is to simplify and improve the construction of automatic brakes and provide one adapted to be readily controlled by the animals and capable of being held into and out of engagement with the wheels.

The invention consists in the construction and novel combination and arrangement of parts, hereinafter fully described, illustrated in the accompanying drawings, and pointed out in the claims hereto appended.

In the drawings, Figure 1 is a perspective view of a brake constructed in accordance with this invention. Fig. 2 is a reverse plan view. Fig. 3 is a longitudinal sectional view.

Referring to the accompanying drawings, 1 designates a vehicle-tongue capable of limited longitudinal movement between front hounds 2, that are secured to a front axle 3 in the ordinary manner and extend rearward therefrom and have their rear ends connected by a curved bar 4. The hounds have secured to them plates 5 and 6, which are arranged, respectively, upon the upper and lower faces of the front ends of the hounds and connect the same and retain the tongue between the said hounds. The tongue is provided in front of the plate 5 with a brake bar 7, which has upon the sides of its ends adjacent to the wheels suitable brake blocks or shoes 8, and the said bar is connected with the axle by stay-chains 9. Secured to the rear end of the tongue is a plate 10, that has its front end connected to the tongue, and it slides in a slot 11 of the front axle and has its rear end pivotally connected to brake-levers 12, that are fulcrumed upon the lower faces of the ends of a cross-bar 13, that is secured to the hounds in the rear of the wheels, and the said brake-levers are provided with brake-shoes 14, arranged to engage the wheels, and when the tongue is moved rearward by the backing of the animals the shoes 8 of the brake-bar 7 are carried into engagement with the wheels and the inner adjacent ends of the brake-levers are moved rearward, which carries the shoes 14 into engagement with the wheels, and it will thus be seen that the wheels are braked upon both sides in an effective manner. The rear end of the plate or bar 10 is provided with a transverse slot 15, in which the pivots 16 of the brake-levers slide when the tongue moves longitudinally, and the bar or plate 10 is provided intermediate of its ends with a longitudinal slot that receives the king-bolt and permits the plate or bar to move longitudinally.

In order to maintain the brakes in or out of engagement with the wheels and hold the tongue stationary, the latter is provided with perforations 17 and 18, which are adapted to register with a perforation 19 of the plate 5 to receive a pin or bolt 20.

From the foregoing description and the accompanying drawings the construction, operation, and advantages of the invention will readily be seen.

What I claim is—

1. The combination, with the front axle and the hounds, of the tongue moving longitudinally between the hounds and provided at its rear end with the bar 10, the cross-bar 13, secured to the hounds and arranged at the back of the wheels, the brake-levers pivoted to the ends of the cross-bar 13 and provided with shoes arranged to engage the back of the wheels and having their inner adjacent ends pivoted to the rear end of the bar 10, the brake-bar secured to the tongue and provided with brake-shoes arranged to engage the front of the wheels, and the stay-chains connecting the brake-bar and the axle, substantially as described.

2. The combination of the front axle, the hounds provided near their rear ends with the cross-bar 13, the plate 6, secured to the lower faces of the front ends of the hounds, the plate 5, secured to the upper faces of the hounds and provided with a perforation 19, the longitudinally-sliding tongue provided with perforations 17 and 18, arranged to register with the perforation 19, the bolt 20, adapted to hold the tongue stationary, the bar 10, secured to the rear end of the tongue and having its rear end provided with a transverse slot, the brake-levers fulcrumed at the ends of the cross-bar 13 and having their inner adjacent ends pivoted in the transverse slot of the bar and their outer ends provided with brake-shoes arranged to engage the back of the wheels, and the brake-bar secured to the tongue at the front of the hounds and provided with shoes arranged to engage the front of the wheels, substantially as described.

3. The combination of the longitudinally-sliding tongue 1, provided with the pivoted brake-levers 12 for the rear face of the front wheels and the brake-bar 7 for the front face of the front wheels, and chains 9, connecting the brake-bar 7 to the axle, both brake-bars moving in unison with the movement of the tongue, as set forth.

In testimony that I claim the foregoing as my own I have hereto affixed my signature in presence of two witnesses.

WILLIAM H. GRANT.

Witnesses:
ANNIE B. BAKER,
C. H. DRUMMEY.